(12) United States Patent
Jia et al.

(10) Patent No.: US 7,725,594 B2
(45) Date of Patent: May 25, 2010

(54) ASSIGNING PRIORITY TO NETWORK TRAFFIC AT CUSTOMER PREMISES

(75) Inventors: Lujun R. Jia, Foxboro, MA (US); Andrew F. Patka, Holliston, MA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 149 days.

(21) Appl. No.: 11/617,992

(22) Filed: Dec. 29, 2006

(65) Prior Publication Data

US 2008/0162659 A1    Jul. 3, 2008

(51) Int. Cl.
*G06F 15/16* (2006.01)

(52) U.S. Cl. .................................. 709/232; 709/245

(58) Field of Classification Search ......... 709/203–206, 709/217–219, 232, 238, 245
See application file for complete search history.

(56) References Cited

U.S. PATENT DOCUMENTS

| | | | | |
|---|---|---|---|---|
| 6,577,628 B1* | 6/2003 | Hejza | .......................... | 370/392 |
| 6,611,522 B1* | 8/2003 | Zheng et al. | ............ | 370/395.21 |
| 6,611,859 B1* | 8/2003 | Kohno | ......................... | 709/203 |
| 6,654,373 B1* | 11/2003 | Maher et al. | ................ | 370/392 |
| 6,792,474 B1* | 9/2004 | Hopprich et al. | ............ | 709/245 |
| 6,954,800 B2* | 10/2005 | Mallory | ....................... | 709/240 |
| 6,956,818 B1* | 10/2005 | Thodiyil | ...................... | 370/230 |
| 7,050,445 B1* | 5/2006 | Zellner et al. | ................ | 370/412 |
| 7,130,903 B2* | 10/2006 | Masuda et al. | .............. | 709/225 |
| 7,257,634 B2* | 8/2007 | Colby et al. | ................. | 709/226 |
| 7,293,107 B1* | 11/2007 | Hanson et al. | .............. | 709/245 |
| 7,356,598 B1* | 4/2008 | Giroir et al. | ................ | 709/228 |
| 2002/0188732 A1* | 12/2002 | Buckman et al. | ............ | 709/228 |
| 2004/0158644 A1* | 8/2004 | Albuquerque et al. | ....... | 709/238 |
| 2005/0175009 A1* | 8/2005 | Bauer | .......................... | 370/390 |
| 2006/0029089 A1* | 2/2006 | Zellner et al. | ................ | 370/412 |
| 2006/0050683 A1* | 3/2006 | Wall et al. | .................... | 370/352 |

OTHER PUBLICATIONS

Droms, R., "Dynamic Host Configuration Protocol", Network Working Group, Request for Comments: 2131, Mar. 1997.
Alexander et al., "DHCP Options and BOOTP Vendor Extensions", Network Working Group, Request for Commnets: 2132, Mar. 1997.

* cited by examiner

*Primary Examiner*—Yasin M Barqadle

(57) ABSTRACT

A device may receive a message from a client device and determine whether the message includes particular data. The device may identify an address within a particular address group when the message includes the particular data. The traffic associated with addresses within the particular address group are assigned priority over traffic associated with addresses outside the particular address group. The device may provide the identified address to the client device so that traffic associated with the client device receives priority over other traffic

12 Claims, 7 Drawing Sheets

| OP | HTYPE | HLEN | HOPS |
|---|---|---|---|
| XID ||||
| SECS || FLAGS ||
| CIADDR ||||
| YIADDR ||||
| SIADDR ||||
| GIADDR ||||
| CHADDR ||||
| SNAME ||||
| FILE ||||
| OPTIONS ||||

FIG. 4

| OPTION CODE | OPTION LENGTH | VENDOR CLASS IDENTIFIER |

FIG. 5

ASSIGNING PRIORITY TO NETWORK TRAFFIC AT CUSTOMER PREMISES

BACKGROUND

Some home users of the Internet share their Internet data connection with audio services (e.g., telephone services) and video services (e.g., television or video-on-demand services). As a result, these audio/video services often have to compete for bandwidth at the customer premises with standard Internet traffic. This can lead to suboptimal quality of the audio/video services.

BRIEF DESCRIPTION OF THE DRAWINGS

FIG. 4 is a diagram of an exemplary format of a discover message;

FIG. 5 is a diagram of an exemplary format of a vendor class identifier option field of a discover message.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may assign priority to network traffic at the customer premises, such as within a customer's household, to give higher priority to video and/or audio traffic and, thus, increase the quality of the video/audio data.

Figure 1:
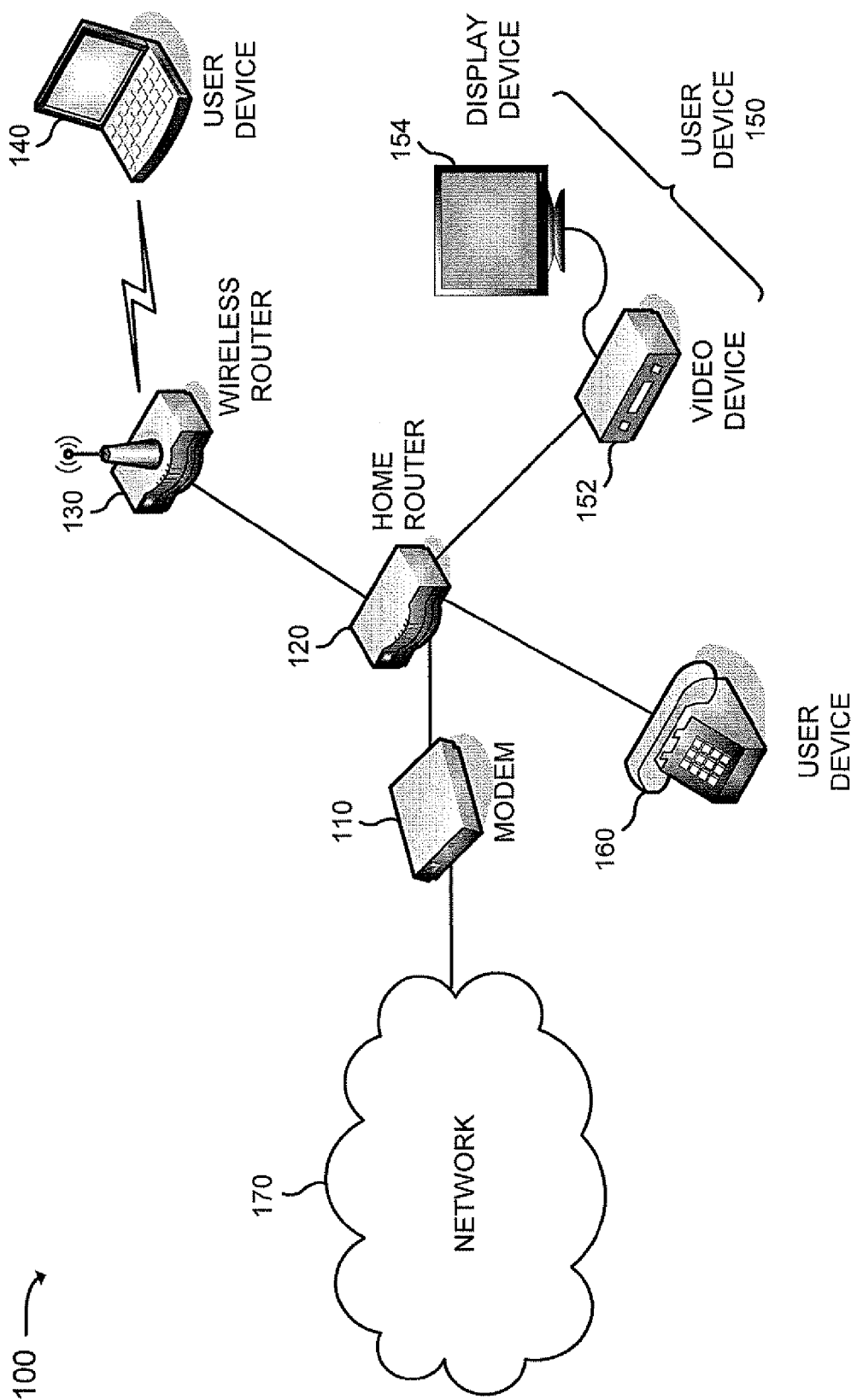
FIG. 1 is an exemplary diagram of a network in which systems and methods described herein may be implemented.

FIG. 1 is an exemplary diagram of a network 100 in which systems and methods described herein may be implemented. Network 100 may include customer premises equipment, such as a modem 110, a home router 120, a wireless router 130, and user devices 140-160, that are connectable to network 170. In practice, network 100 may include more, fewer, or different devices than are shown in FIG. 1. Also, two or more of these devices may be implemented within a single device, or a single device may be implemented as multiple, distributed devices. For example, modem 110, home router 120, and/or wireless router 130 may be implemented as a single device.

Modem 110 may include a device, such as a cable modem, a DSL modem, a dial-up modem, or another type of modem, that processes data received on an external link (e.g., from network 170) for transmission on a local link (e.g., to home router 120), and vice versa.

Home router 120 may include a device that may provide connectivity between the customer premises equipment and network 170. In one implementation, home router 120 may function as a dynamic host configuration protocol (DHCP) server to assign network addresses, and provide other configuration information, to user devices 140-160. Home router 120 may also provide firewall functionality, such as packet filtering and protection against network attacks.

Wireless router 130 may include a device that may provide wireless connectivity to one or more user devices 140-160. For example, wireless router 130 may permit a wireless user device (e.g., user device 140) to connect to other customer premises equipment and/or gain access to network 170.

User devices 140-160 may include any type or form of computation or communication device that may communicate on network 170. User device 140 may include, for example, a personal computer, a laptop, a personal digital assistant (PDA), or another type of computation or communication device that may connect to wireless router 130 via a wireless connection. User device 150 may include a video device 152 and a display device 154. Video device 152 may include a set-top box or another type of device that is capable of providing video services. Display device 154 may include a monitor, television, or another type of device that is capable of displaying video data. User device 160 may include a telephone device or another type of device that is capable of providing telephone services.

Network 170 may include a wide area network (e.g., the Internet), an intranet, a telephone network (e.g., the Public Switched Telephone Network), or a combination of networks. Cable modem 110 may connect to network 170 via a wired or wireless connection.

Figure 2:
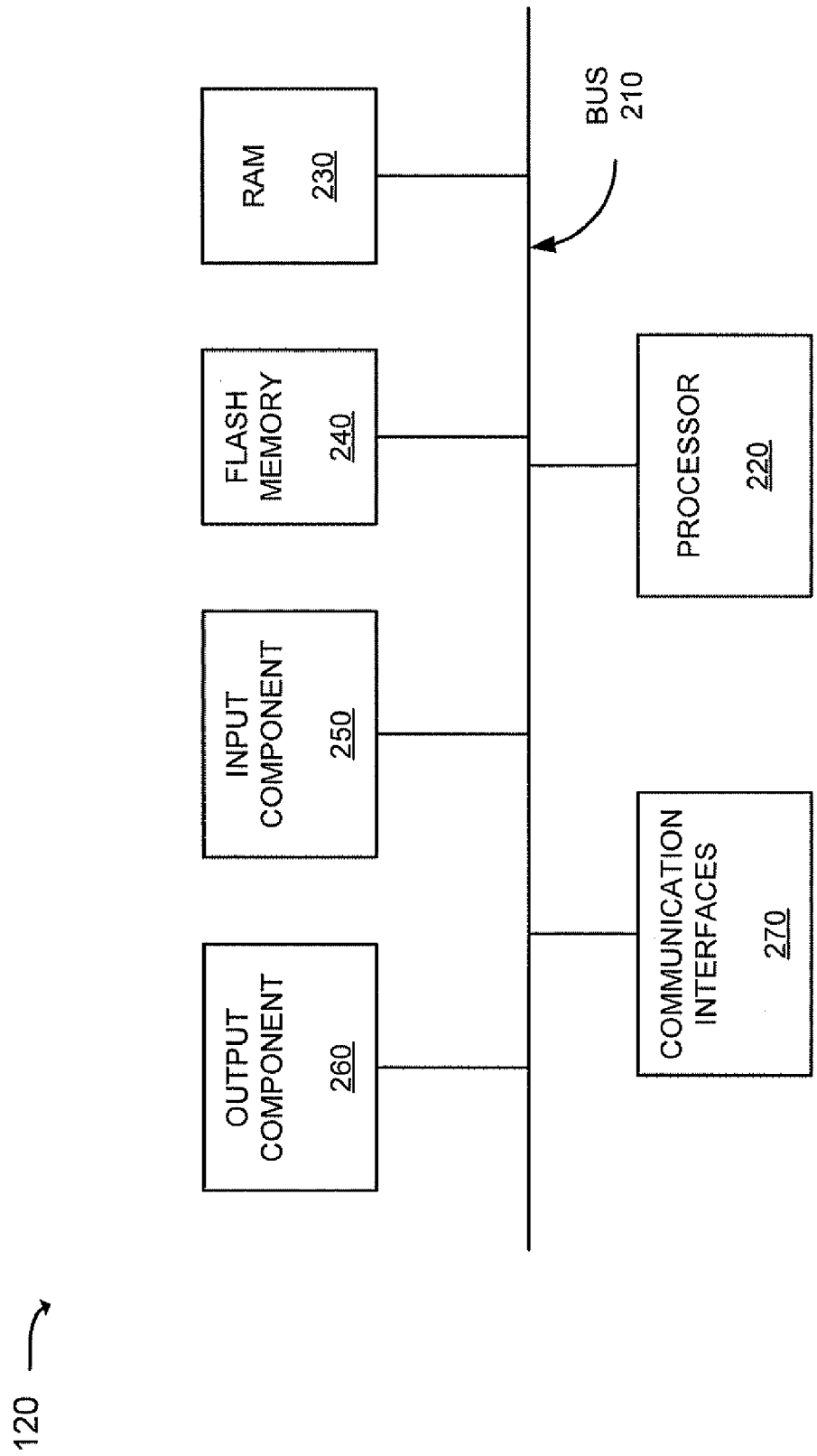
FIG. 2 is an exemplary diagram of components of the home router of FIG. 1.

FIG. 2 is an exemplary diagram of components of home router 120. Home router 120 may include a bus 210, a processor 220, a random access memory 230, a flash memory 240, an input component 250, an output component 260, and communication interfaces 270. Bus 210 may include a path that permits communication among the elements of home router 120.

Processor 220 may include a processor, microprocessor, or processing logic that may interpret and execute instructions. RAM 230 may include any type of dynamic storage device that may store information and instructions for execution by processor 220. Flash memory 240 may include any type of non-volatile storage device that may store information for use by processor 220.

Input component 250 may include a mechanism that permits an operator to input information to home router 120, such as a button, switch, input key, etc. Output component 260 may include a mechanism that outputs information to the operator, such as a display, one or more light emitting diodes (LEDs), a speaker, etc. Communication interfaces 270 may include any transceiver-like mechanisms that enable home router 120 to communicate with other devices and/or systems. For example, communication interfaces 270 may include one or more Ethernet interfaces, optical interfaces, coaxial interfaces, or the like.

As will be described in detail below, home router 120 may perform certain operations relating to the assignment of addresses to customer premises equipment and the subsequent processing of traffic for the customer premises equipment. Home router 120 may perform these operations in response to processor 220 executing software instructions contained in a computer-readable medium, such as RAM 230. A computer-readable medium may be defined as a physical or logical memory device and/or carrier wave.

The software instructions may be read into RAM 230 from another computer-readable medium, such as flash memory 240, or from another device via communication interfaces 270. The software instructions contained in RAM 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

As explained above, home router 120 may be configured to function as a DHCP server. In this capacity, home router 120 may maintain a pool of addresses available for assignment to client devices, such as user devices 140-160. Home router 120 may provide a unique network address and other configuration parameters that a requesting device may need to communicate on network 170 using DHCP. Home router 120 may set a length of time, called a lease, for which a provided network address may be valid. Home router 120 may ensure that all network addresses are unique (i.e., no network address is assigned to a second client device while the first client device's assignment is valid (its lease has not expired)).

Figure 3A:
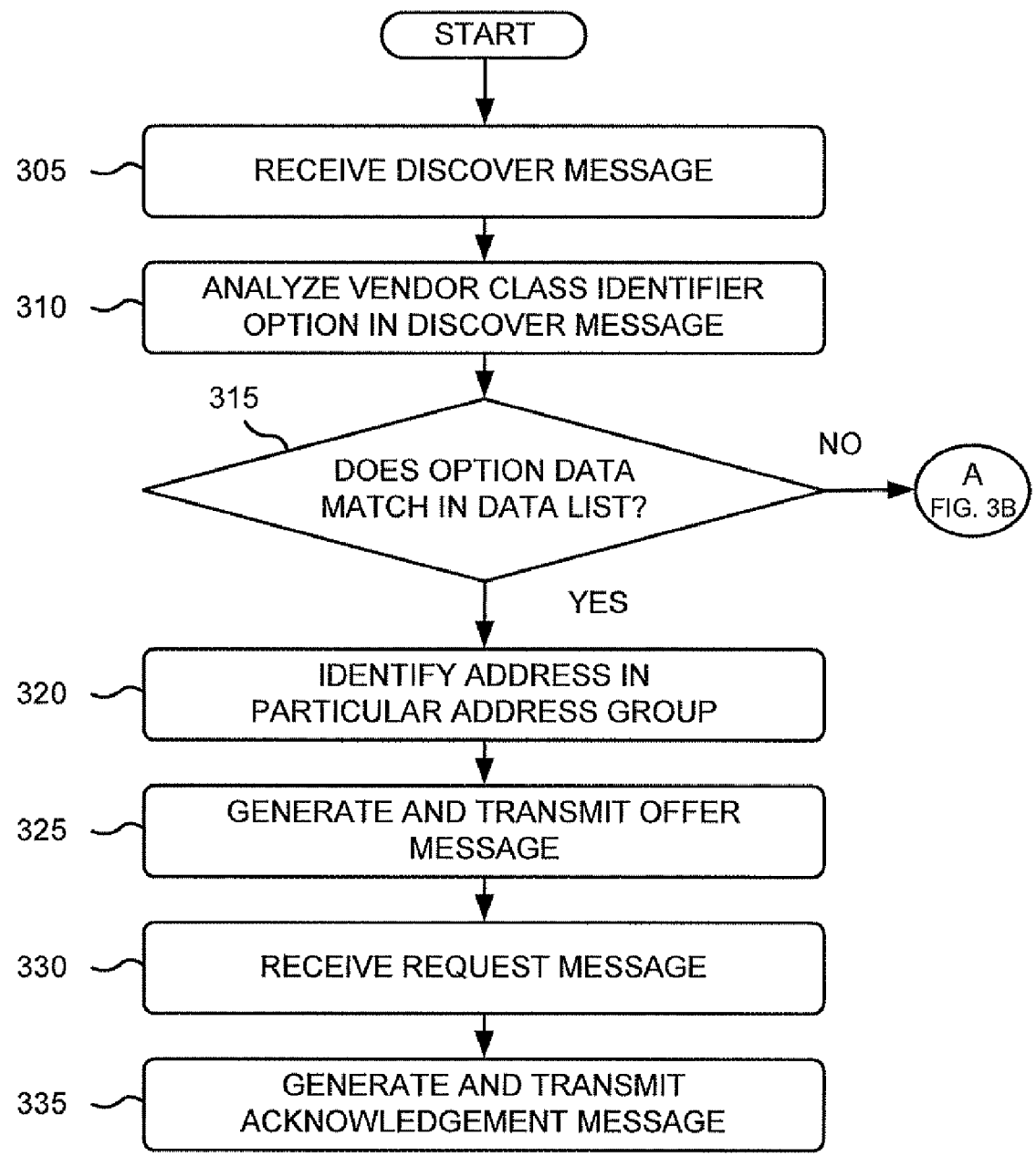
FIGS. 3A-3B depict a flowchart of an exemplary process for assigning a network address.
Figure 3B:
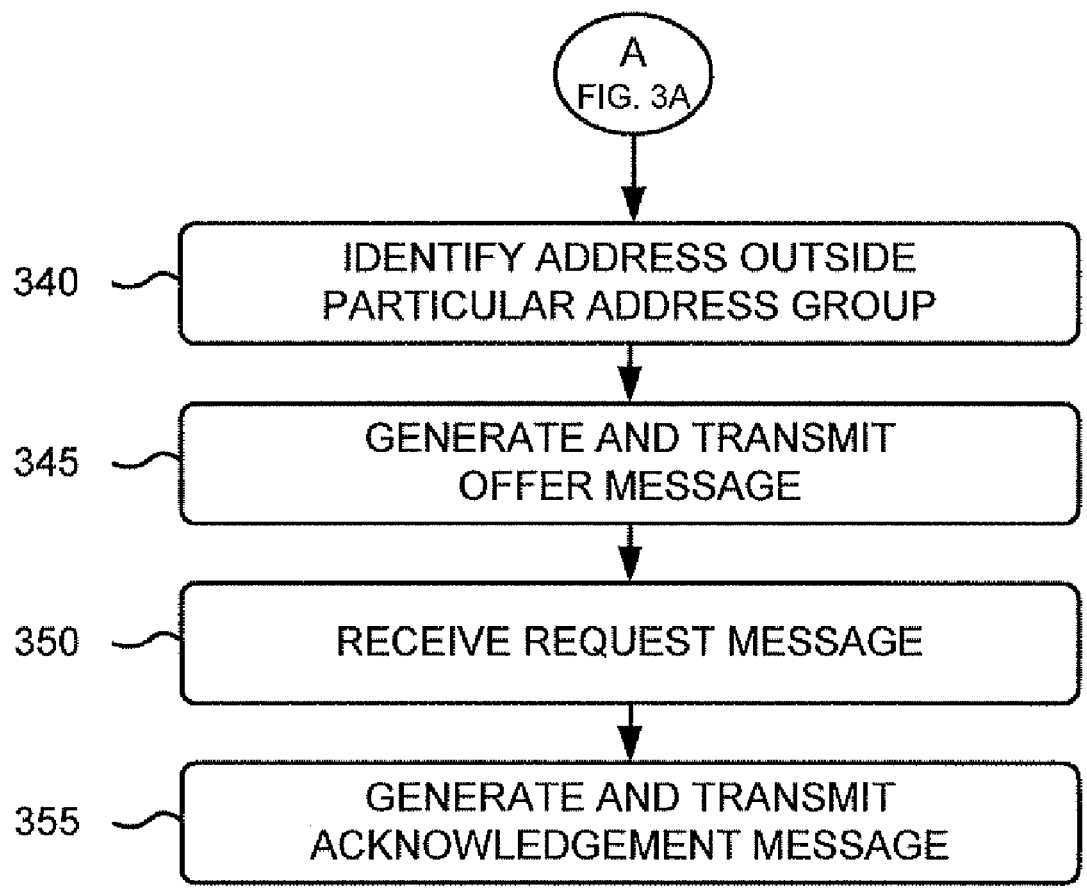

FIGS. 3A-3B depict a flowchart of an exemplary process for assigning a network address. In one implementation, the process of FIGS. 3A-3B may be performed by one or more software and/or hardware components within home router 120.

Processing may begin with a discover message being received (block 305) (FIG. 3A). For example, a client device, such as one of user devices 140-160, may generate a DHCP discover message that indicates that the client device desires to be configured for network access. The client device may broadcast the discover message to a predetermined broadcast address. The discover message may include options that suggest values for the network address and lease duration. The discover message may be received by home router 120. In one implementation, one or more relay devices may receive the discover message and pass the discover message to home router 120.

FIG. 4 is a diagram of an exemplary format of a discover message. In one implementation, as shown in FIG. 4, the discover message may include a message op code (op) field, a hardware address type (htype) field, a hardware address length (hlen) field, a hops field, a transaction id (xid) field, a seconds (seqs) field, a flags field, a client IP address (ciaddr) field, a your IP address (yiaddr) field, a server IP address (siaddr) field, a relay agent IP address (giaddr) field, a client hardware address (chaddr) field, a server host name (sname) field, a boot file name (file) field, and an options field. Each of these fields is described in detail in R. Droms, "Dynamic Host Configuration Protocol," RFC 2131, March 1997, the contents of which is incorporated herein by reference.

The options field may permit configuration parameters and other control information to be passed from a client device to home router 120. The options field may have a fixed length or a variable length and may begin with a code number that uniquely identifies the option. One particular option ("option 60") may include the vendor class identifier option field. The vendor class identifier option field may be used by a client device to identify the vendor type and configuration of the client device. Vendors may choose to define specific vendor class identifiers to convey particular configuration or other identification information about a client device. In one implementation, a vendor class identifier may encode the client device's hardware configuration.

FIG. 5 is a diagram of an exemplary format of the vendor class identifier option field of a discover message. In one implementation, as shown in FIG. 5, the options field may include an option code field, an option length field, and a vendor class identifier field. The options code field may include the unique code corresponding to the vendor class identifier option (i.e., code "60"). The option length field may identify the length of the option data. The vendor class identifier field may include data that identifies hardware and/or software information relating to the client device.

Returning to FIG. 3A, the vendor class identifier option in the discover message may be analyzed (block 310). For example, home router 120 may determine whether the discover message includes a vendor class identifier option by, for example, looking for the unique code associated with the vendor class identifier option (i.e., code "60") in the options field of the discover message. If the discover message does not include the vendor class identifier option, home router 120 may assign a network address to the client device according to a standard process, such as the process described in R. Droms, "Dynamic Host Configuration Protocol," RFC 2131, March 1997. If the discover message includes the vendor class identifier option, home router 120 may determine the data stored in the vendor class identifier field.

It may be determined whether the data in the vendor class identifier field matches data in a list of predetermined data (block 315). In one implementation, the list of predetermined data may include one or more data items relating to particular video and/or audio devices. For example, one data item may include IP-STB to refer to an IP set-top box. Another data item may include IP-TEL to refer to an IP telephone device.

If the data in the vendor class identifier field matches data in the list of predetermined data (block 315—YES), then an address in a particular address group may be identified (block 320). For example, home router 120 may identify an available address in the particular address group. The particular address group may include a subset of the addresses in the address pool maintained by home router 120. Home router 120 may assign a higher priority to the addresses within the particular address group such that home router 120 may apply appropriate quality of service (QoS) policies to traffic associated with client devices to which these addresses are assigned. The QoS policies may provide traffic associated with these client devices strict priority over any best effort or background traffic. This higher (strict) priority may ensure the necessary QoS to provide quality video and/or audio data.

An offer message may be generated and transmitted to the client device (block 325). For example, home router 120 may generate an offer message that includes the identified address in, for example, the yiaddr field and possibly other configuration parameters in the options field. Home router 120 may transmit the offer message to the client device from which it received the discover message.

The client device may receive the offer message and analyze its contents. The client device may generate a request message that may identify home router 120 and may specify the desired network address and/or configuration parameters. The desired network address may match the address identified in the offer message. The client device may send the request message to home router 120 (e.g., by broadcasting or unicasting).

The request message may be received (block 330). For example, home router 120 may receive the request message and store the network address and/or configuration parameters for the client device in memory.

An acknowledgement message may be generated and transmitted (block 335). For example, home router 120 may generate an acknowledgement message that contains the network address, the configuration parameters, and/or a duration of the lease. Home router 120 may send the acknowledgement message to the client device. The client device may receive the acknowledgement message and check the configuration parameters contained in the acknowledgement message. The client device may also record the duration of the lease. At this point, the client device may be properly configured to communicate on the network.

If the data in the vendor class identifier field does not match data in the list of predetermined data (block 315—NO), then an address outside the particular address group may be identified (block 340) (FIG. 3B). For example, home router 120 may identify an available address from the address pool that is not included in the particular address group.

An offer message may be generated and transmitted to the client device (block 345). For example, home router 120 may generate an offer message that includes the identified address in, for example, the yiaddr field and possibly other configuration parameters in the options field. Home router 120 may transmit the offer message to the client device from which it received the discover message.

The client device may receive the offer message and analyze its contents. The client device may generate a request message that may identify home router 120 and may specify the desired network address and/or configuration parameters. The desired network address may match the address identified in the offer message. The client device may send the request message to home router 120 (e.g., by broadcasting or unicasting).

The request message may be received (block 350). For example, home router 120 may receive the request message and store the network address and/or configuration parameters for the client device in memory.

An acknowledgement message may be generated and transmitted (block 355). For example, home router 120 may generate an acknowledgement message that contains the network address, the configuration parameters, and/or a duration of the lease. Home router 120 may send the acknowledgement message to the client device. The client device may receive the acknowledgement message and check the configuration parameters contained in the acknowledgement message. The client device may also record the duration of the lease. At this point, the client device may be properly configured to communicate on the network.

Figure 6:
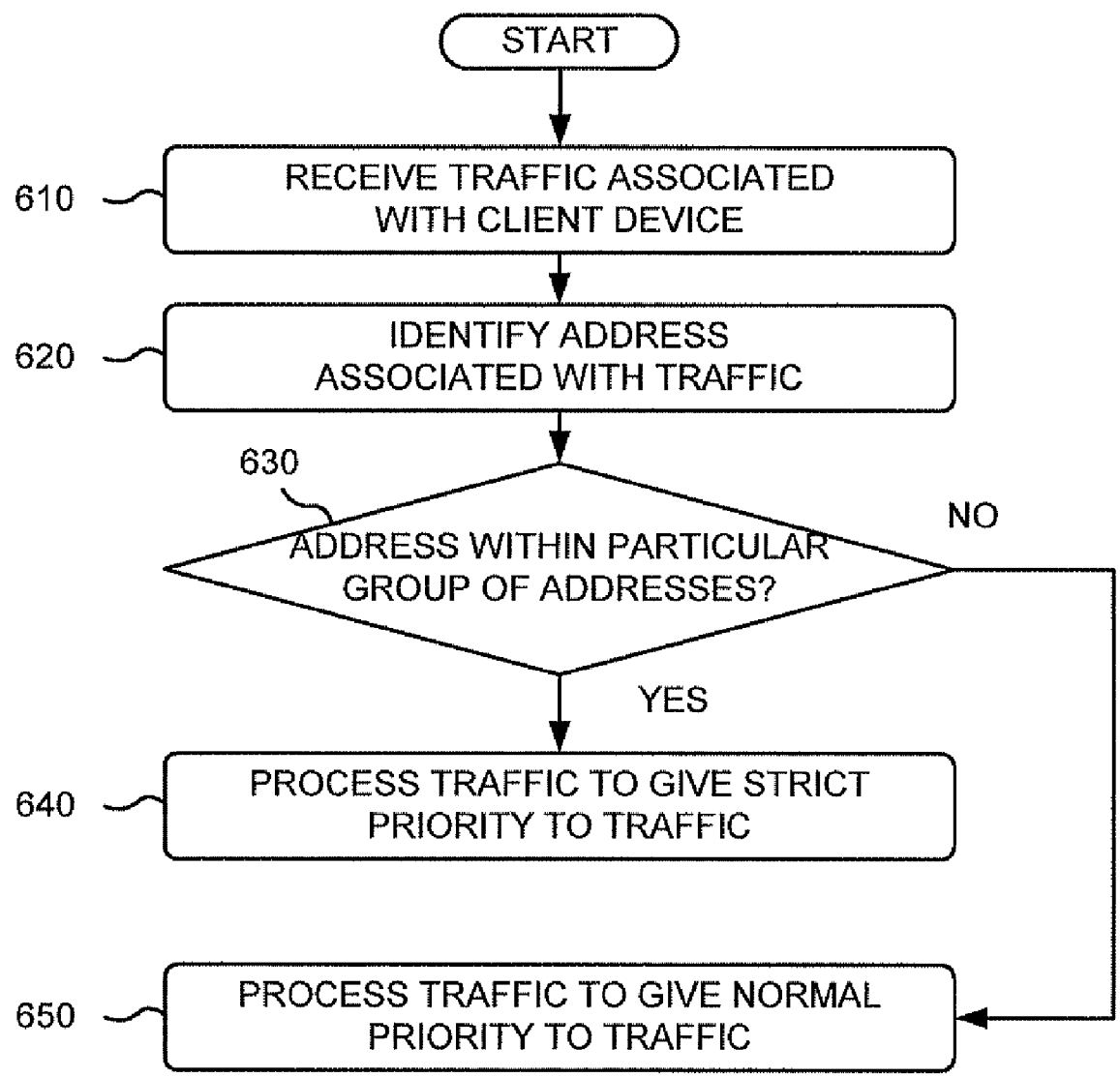
FIG. 6 is a flowchart of an exemplary process for processing network traffic.

FIG. 6 is a flowchart of an exemplary process for processing network traffic. Processing may begin with traffic associated with a client device being received (block 610). For example, home router 120 may receive either traffic intended for the client device ("incoming traffic) or traffic originating at the client device ("outgoing traffic").

The address associated with the traffic may be identified (block 620). For example, in the case of incoming traffic, home router 120 may identify the destination address associated with the traffic. In the case of outgoing traffic, home router 120 may identify the source address associated with the traffic. In other words, for any traffic received by home router 120, home router 120 may identify the address associated with customer premises equipment for which the traffic is intended or from which the traffic originated.

It may be determined whether the identified address is one of the addresses in the particular address group (block 630). If the identified address is included within the particular address group (block 630—YES), then the traffic may be processed to give strict priority to the traffic (block 640). For example, home router 120 may give the traffic strict priority over any best effort or background traffic also being processed by home router 120. This higher (strict) priority may ensure the necessary QoS to provide quality video and/or audio data.

If the identified address is not included within the particular address group (block 630—NO), then the traffic may be processed to give normal priority to the traffic (block 650). For example, home router 120 may give the traffic its normal priority with regard to other traffic also being processed by home router 120.

Implementations described herein may ensure high quality video and/or audio services by assigning video and/or audio devices in a local network addresses within a predetermined group of addresses and then processing traffic associated with these devices with higher priority over other traffic.

The foregoing description provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 3A, 3B, and 6, the order of the acts may be modified in other implementations. Further, non-dependent acts may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the invention. Thus, the operation and behavior of the systems and methods were described without reference to the specific software code—it being understood that software and control hardware can be designed to implement the systems and methods based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving a dynamic host configuration protocol (DHCP) discover message from a client device;
   determining whether the message includes particular data, including vendor class identifier data that indicates that the client device is a video device or an audio device, where if the message includes the particular data, the method further comprises:
   identifying an address within a particular address group that has a first priority, and
   assigning the first priority to traffic associated with addresses within the particular address group, or where
   if the message does not include the particular data, the method further comprises:
   identifying a second address within a second address group that is different than the particular address group, and that has a second priority that is lower than the first priority, and
   assigning the second priority to traffic associated with addresses within the second group; and
   providing the identified address or the identified second address to the client device, where if the identified address is provided, the client device gives the traffic, assigned the first priority, priority over other traffic.

2. The method of claim 1, where the discover message includes a suggested value for a duration of a lease associated with the client device.

3. The method of claim 1, further comprising:
   maintaining a list of video devices or audio devices; and
   where determining whether the message includes the particular data includes determining whether the client device is a video device or an audio device on the list of video devices or audio devices.

4. The method of claim 1, further comprising:
   assigning the identified address by generating an offer message that includes the identified address; and where providing the identified address includes transmitting the offer message to the client device.

5. The method of claim 1, further comprising:
receiving traffic associated with the client device;
determining whether an address associated with the traffic is included within the particular address group; and
processing the traffic to give the traffic priority over other traffic when the associated address is included within the particular address group.

6. The method of claim 5, where determining whether the address associated with the traffic is included within the particular address group includes:
identifying a source address or a destination address associated with the traffic, and
determining whether the source address or the destination address is an address included within the particular address group.

7. The method of claim 1, further comprising:
assigning priority to traffic associated with addresses within the particular address group over other traffic associated with addresses outside the particular address group, based on Quality of Service (QoS) policies.

8. A device, comprising:
a memory to store a pool of available addresses; and
a processor to:
receive a message, including a dynamic host configuration protocol (DHCP) discover message, from a client device that is located on a same local network as the device;
determine whether the message includes particular data, including vendor class identifier data that indicates that the client device is a video device or an audio device, where if the message includes the particular data, the processor is further to:
identify an address within a particular group of addresses, in the pool of available addresses, that has first priority, and
assign the first priority to traffic associated with addresses within the particular group of addresses, or where if the message does not include the particular data, the processor is further to:
identify a second address within a second group of addresses, in the pool of available addresses, that is different than the particular group of addresses, and that has a second priority that is lower than the first priority, and
assign a second priority to traffic associated with the second group of addresses; and
provide the identified address or the identified second address to the client device, where if the identified address is provided, the client device gives the traffic, assigned the first priority, priority over other traffic.

9. The device of claim 8, where the processor:
maintains a list of video devices or audio devices; and
determines whether the client device is a video device or an audio device on the list of video devices or audio devices.

10. The device of claim 8, where the processor:
generates an offer message that includes the identified address; and
transmits the offer message to the client device.

11. The device of claim 8, where the processor further:
receives traffic associated with the client devices;
determines whether an address associated with the traffic is included within the particular group of addresses; and
processes the traffic to give the traffic priority over other traffic when the associated address is included within the particular group of addresses.

12. The device of claim 11, where when determining whether the address associated with the traffic is included within the particular group of addresses, the processor:
identifies a source address or a destination address associated with the traffic; and
determines whether the source address or the destination address is an address included within the particular group of addresses.

* * * * *